United States Patent [19]

Voss

[11] Patent Number: 4,502,437
[45] Date of Patent: Mar. 5, 1985

[54] ELECTRICAL FUEL CONTROL SYSTEM AND METHOD FOR DIESEL ENGINES

[75] Inventor: James R. Voss, Wilbraham, Mass.

[73] Assignee: AMBAC Industries, Incorporated, Springfield, Mass.

[21] Appl. No.: 317,253

[22] Filed: Nov. 2, 1981

[51] Int. Cl.³ ............................................. F02D 31/00
[52] U.S. Cl. .................................... 123/357; 123/383; 123/494
[58] Field of Search .............. 123/357, 478, 480, 486, 123/487, 383, 564, 494

[56] References Cited

U.S. PATENT DOCUMENTS

| | | | |
|---|---|---|---|
| 2,396,618 | 3/1946 | Stieglitz | 123/564 |
| 4,357,920 | 11/1982 | Stumpp | 123/358 |
| 4,357,923 | 11/1982 | Hideg | 123/493 |
| 4,368,705 | 1/1983 | Stevenson | 123/357 |
| 4,372,266 | 2/1983 | Hiyama | 123/357 |

Primary Examiner—Charles J. Myhre
Assistant Examiner—Carl Stuart Miller
Attorney, Agent, or Firm—Stephen A. Schneeberger

[57] ABSTRACT

An electrical governor system for a turbocharged diesel engine which eliminates objectionable puffs of smoke when gears are shifted, by limiting the rate of fuel delivery to the engine at such times. The response characteristics of the turbocharger to changes in kinetic energy of the engine exhaust flow are determined and stored in a microprocessor memory. The engine operating parameters are monitored to produce signals representative of engine speed and fuel delivery rate, and these signals are supplied to the microprocessor to cause it to generate a signal representative of the maximum rate at which fuel can then be delivered to the engine without producing objectionable exhaust smoke. The latter signal is used to control the fuel-control each automatically, through a stepping motor arrangement, at appropriate times to limit the fuel delivery rate to said maximum and thus avoid objectionable smoke puffs.

14 Claims, 7 Drawing Figures

TYPICAL MEMORY ARRAY FOR T(S,Z)

| MEMORY POSITION | STORED VALUE | NAME |
|---|---|---|
| 1024 | 67 | T(800,30) |
| 1025 | 72 | T(1300,30) |
| 1026 | 76 | T(1800,30) |
| 1027 | 149 | T(800,95) |
| 1028 | 151 | T(1300,95) |
| 1029 | 150 | T(1800,95) |
| 1030 | 235 | T(800,160) |
| 1031 | 232 | T(1300,160) |
| 1032 | 230 | T(1800,160) |

TYPICAL MEMORY ARRAY FOR A(S)

| MEMORY POSITION | STORED VALUE | NAME |
|---|---|---|
| 1033 | 0.73 | A(800) |
| 1034 | 1.10 | A(1300) |
| 1035 | 1.50 | A(1800) |

ELECTRICAL FUEL CONTROL SYSTEM AND METHOD FOR DIESEL ENGINES

BACKGROUND OF THE INVENTION

This invention relates to improvements in systems and methods for the control of the fuel supply for diesel engines, and particularly to such control systems which are primarily electrical in nature. Electrical control systems of this class are commonly known as electrical governors, and in the preferred embodiment of the invention described herein in which the principal element of the governor is a microprocessor, are commonly designated as microprocessor governors.

More particularly, the invention concerns itself in one primary aspect with the prevention or minimizing of puffs of smoke which tend to be produced transiently when the fuel to a turbocharged diesel engine is suddenly and rapidly increased. Such puffs of smoke, although generally appearing only momentarily, are nevertheless objectionable because of the high visibility of their rather slight contamination of the environment, and to some extent because they may be seen as indicative of some wastage of fuel. Further, the intensity of the smoke, i.e. its visual opacity is limited by law.

The type of engine system with regard to which the invention will be specifically described, and to which it is particularly applicable, comprises a turbocharged diesel engine for operating a load, a fuel injection pump for delivering timed, metered quantities of diesel fuel to the cylinders of the engine in timed succession, an operator-controlled throttle control, such as a foot throttle, and an electrical governor which controls the position of the fuel control rack in the fuel injection pump to determine the quantity of fuel delivered to each engine cylinder during each cycle of the engine. An engine system of this type is, for example, particularly suited for use in automotive vehicles such as large trucks.

In the past, mechanical governors have commonly been used to control the supply of fuel to diesel engines. In such use the governor is commonly known as a variable speed governor in that it permits wide variation of the speed of the engine in response to operation of the operator's control throttle. At the same time, the governor typically also provides a number of limits on the rate at which fuel can be delivered to the engine at various engine speeds. One such typical limit is provided by the so-called low-idle control, which prevents the engine speed from falling below a level which might produce stalling of the engine; there is typically also employed a high-speed limit which limits the fuel delivery rate if the engine speed tends to exceed a predetermined maximum value, to protect the engine from the harm which would result from excessively high-speed operation; further, within the speed range between the low-idle limit and the high-speed limit, there is typically provided a so-called torque limit of fuel which prevents over-fueling of the engine in the intermediate range of engine speeds. The construction and the operation of such mechanical governors are well known and have been presented fully in patents and other technical publications.

In such mechanically governed engine systems using a turbocharger for the engine, the above-described objectionable phenomenon of smoke puffs also existed unless special measures were taken to prevent it. These puffs occur when the air charge supplied to the cylinders of the diesel engine is insufficient to accomplish complete combustion of the amount of fuel injected into the engine cylinders at that time. In a turbocharged engine, under steady-state operating conditions quite high injected fuel levels can be used without smoke production because the turbocharger injects compressed air into the cylinders; the compressed air contains a higher concentration of oxygen molecules than ordinary air at atmospheric pressure, and is therefore able to provide for the desired complete combustion of the fuel under steady-state conditions. The air compressor of the turbocharger is typically driven directly from a small turbine in the engine exhaust line, and the speed of the turbine increases with the kinetic energy of the exhaust gas flow and hence with the load on the engine and, to some extent, with increases in the speed of the engine. The turbine typically drives the air compressor in the turbocharger directly in such manner that, under steady-state operating conditions of the engine, the large amount of fuel delivered to the engine under full load conditions is combusted sufficiently fully to avoid objectionable smoking; this is because the exhaust gases are then of high kinetic energy, operate the turbocharger turbine at a high rate, and cause the compressor in the turbocharger to produce air sufficiently pressurized to provide the desired complete combustion. Thus, despite high levels of fuel delivered to the engine, the turbocharger automatically delivers enough air to the engine to assure the desired lean mixture for which objectionable smoking does not occur.

If the mechanical governor and the turbocharger could respond and act entirely instantaneously, there would always be sufficient air to completely burn the fuel in the engine, and smoking would never occur. Unfortunately, the system is not capable of such instantaneous action, and there is always some lag between the time when a sudden increase in fuel occurs and the time when the air charge to the engine cylinders has been increased to the level required to burn the increased amount of fuel completely. Accordingly, while the air charge is "catching up" to the fuel increase, there will be a momentary deficiency of air with resultant smoke. Such air deficiencies and smoke can occur when the operator control calls for a sudden increase in fuel in order to accelerate the vehicle from a low speed. It also typically occur during shifting of gears, at which time declutching of the engine from the load throws the engine into a no-load condition at the same time that the operator permits the engine speed to decrease; this greatly reduces the energy of the exhaust gases, slows down the turbine, slows down the compressor, and greatly reduces the air charge into the engine. When the operator reengages the clutch and applies power through his throttle control, the resultant large and sudden increase in fuel to the engine is not immediately accompanied by sufficient delivery of air charge to the engine, and objectionable smoke momentarily appears from the exhaust until the increased exhaust energy can bring the turbocharger up to the speed required for complete fuel combustion.

Puff control devices have been proposed for use in mechanical governors to eliminate or minimize the generation of smoke puffs described above. Without describing the make-up of such mechanical governors and their puff control devices in detail, it is sufficient for the present purposes to mention that such mechanical governors typically include a torque plate which limits the extent to which the fuel pump rack can move in the fuel-increasing direction under full load conditions. To minimize the production of smoke puffs, it is possible to mount the torque plate for reciprocating motion, spring bias it in the direction which results in reduced fuel delivery, and provide a diaphragm and piston arrangement connected to the torque-plate supporting shaft and supplied on one side with pressurized air at the same pressure as that supplied to the engine intake manifold from the turbocharger. The arrangement is such that when the the manifold air pressure is high the torque plate will be moved against the spring bias to permit a high level of maximum fuel delivery; however, should the manifold air pressure be unusually low when the fuel delivery rate is high, the spring will advance the torque plate in the fuel-decreasing direction and limit the fuel delivery to a level which will avoid generating smoke puffs.

The latter mechanical system has at least several limitations. The primary problem is that the system generally does not hold the maximum fuel rate just below the smoke level while the turbocharger is accelerating during the puff generating interval, as would be desired for maximum efficiency. That is, the movement of the torque plate does not accurately track the pressure-recovery curve of the turbocharger. Typically, the torque plate will stay at its steady-state position without substantial movement by the puff control system until a very substantial deficiency of turbocharger air pressure has accumulated, and then will move quite rapidly to, or very nearly to, its extreme low fuel position. Once there, it tends to remain there until the turbocharger has recovered speed sufficiently to produce a very substantial air pressure increase, and then moves rapidly to, or close to, its maximum fuel position again. As a result, one can design such system in either of two general ways, neither of which is completely satisfactory; it can be designed so that the torque plate moves readily and easily between its two extreme positions in response to small pressure changes, in which case it will permit reapplication of high fuel delivery rates too quickly, with resultant undesirably high smoke levels in the puff; or, it can be made so that the torque plate is relatively hard to move so that such undesirably high levels of smoke in the puff are prevented, but the time required for the fuel to resume its higher steady-state rate will then be unduly prolonged.

In recent years it has been proposed that the fuel, air and even the timing of a turbocharged diesel engine be controlled electrically rather than mechanically. In such an arrangement, various significant parameters of engine operation are sensed, converted to electrical signals, and supplied to an electrical control system which operates on the received sensor signals to produce output control signals for controlling the major engine operating parameters. While in general this can be done using discrete analog electrical components, it is presently preferred to do this by means of digital circuitry, preferably greatly miniaturized, as in a so-called microprocessor. The microprocessor normally comprises small integrated-circuit semi-conductor chips especially designed for the particular application, and can be made very small and can be mounted at any convenient location adjacent the engine. Typically, in such a system a sensor may be provided to produce an electrical signal indicative of the operator's instantaneous setting of the throttle control by which he indicates the level of engine fuel which he wishes to produce, as by sensing the position of the operator's foot-throttle linkage. Electrical signals indicative of engine speed are readily obtained by providing a small magnetic sensing or pick-up device positioned adjacent the teeth of a gear rotating with the engine drive shaft, and counting the number of pulses generated per second by conventional electronic means. In such case the usual arrangement of mechanical governor with fly weights, adjustable fulcrum lever and torque-limiting stop plate may be entirely eliminated, and the position of the rack which controls the rate of fuel delivery by the fuel injection pump controlled entirely by the electrical control system, which may then be termed an electrical governor since it supplies functions of the earlier mechanical governor.

In such an electrical governor system it would be possible to sense the engine intake manifold pressure produced by the turbocharger by means of an appropriate pressure-sensing device in the manifold. The pressure thereby sensed could be converted to an electrical signal and supplied to the electrical governor system, and the latter pressure-representing signal could then be used to limit the amount of fuel supplied to the engine to a level which does not produce objectionable smoke.

A drawback of the latter arrangement lies in the cost of providing an appropriate sensor which would operate with accuracy in the environment of the engine intake manifold, and mounted so as to be easily replaceable. Further, even a relatively costly sensor can be expected to fail prematurely on occasions, and even if it does not do so it can be expected to have some limited life, ultimately requiring the cost of a replacement sensor. In addition, it can be expected that such a sensor may on occasions deteriorate gradually over a period of time during which it is not entirely inoperative but instead provides inaccurate information as to pressure, a situation which may be difficult to diagnose from overall engine operation, and will generally require a decision as to when it has deteriorated to the point where it should be replaced, leaving the possibility of unsatisfactory operation over a period of time with excessive generation of objectionable puffs until replacement is finally made.

SUMMARY OF THE INVENTION

According to the invention, these drawbacks are obviated by eliminating the need for the pressure sensor entirely. This is accomplished by, in effect, storing in the electrical governor sufficient information to enable generation therefrom of a signal which varies as a known function of that manifold pressure which the particular type of engine being controlled produces under its various conditions of operation, at least during the times when puffs of objectionable smoke would tend to be produced. The latter signal is then used to limit the amount of fuel delivered to the engine during the speed recovery times of the turbocharger when objectionable smoke puffs would otherwise be produced.

In the preferred embodiment of the invention described hereinafter, this smoke-limit signal is generated continuously but is used to control the fuel only during the puff-generating intervals. Also, while in some cases it is possible in accordance with the invention to produce a signal which is directly proportional to the intake manifold pressure and then derive from that signal a control signal for limiting the fuel during the puff-generation interval to a value which is always just below that producing objectional smoke levels, it is preferred to store in the electrical circuitry information which represents a function different from, but related in known manner to, the intake manifold pressure, and to derive the smoke-limit signal from the latter type of stored information without producing a separate signal directly proportional to intake manifold pressure.

More particularly, in the preferred form of the invention information is stored from which there is derived a signal which is a known function of the time rate of change of the intake manifold pressure, and the information contained in such signal is in effect integrated, in the mathematical sense, to produce the desired signal which is a known function of intake manifold pressure; this latter signal is used to limit fuel delivery during the puff-generating time intervals.

Thus in a preferred form of the invention use is made of the following relationship:

$$dF_{sl}/dt = A(s)[T(s,z) - F_{sl}].$$

The function $A(s)$ and the function $T(s,z)$ (where s is the engine speed and z is the displacement of the fuel pump rack from a reference position) are stored in the governor memory, and by supplying the engine-speed representing signal from the speed sensor and by supplying an electrical signal representing the current position of the fuel rack as it is changed by the control circuitry, the separate signals representative of the corresponding instantaneous values of $A(s)$ and $T(s,z)$ are generated. The signal representing the smoke-limit value $F_{sl}$ is the smoke-limit output signal of the electrical governor, and therefore is also internally available. Accordingly, the electric governor is able to produce the difference signal $T(s,z) - F_{sl}$ and to multiply it by a signal representing $A(s)$, to produce the signal representing $dF_{sl}/dt$.

In the case of one type of diesel engine, for example, $A(s)$ may equal $a_i s$ and $T(s,z)$ may equal $b_i z + c_i s$, where $a_i$, $b_i$ and $c_i$ are sets of constants dependant on engine and turbocharger characteristics. The values of the latter constants can conceivably be calculated from an analysis of the particular engine and turbocharger, but it has been found much more practical and exact to determine them experimentally. To do this, an engine system of the selected type is connected to a dynamometer, with an adjustable load connected to the engine, and the values of the constants b and c experimentally varied to determine, for all contemplated combinations of values of s and z, a value for b and a value for c such that T equals a target value of fuel delivery rate which produces an acceptable low level of smoke opacity from the exhaust, e.g., 20% opacity or less, for any combination of the values of s and z. The value of $A(s)$ may be determined by measuring the time response of the turbocharger as the engine is abruptly moved to a given combination of S and Z, as described more fully hereinafter.

In the preferred digital embodiment of the invention, the information obtained by the above-described mapping of the characteristics of the particular engine type is appropriately stored in digital form, and when called upon the circuitry produces a signal proportional to the function $A(T - F_{sl})$, which equals $dF_{sl}/dt$. In the preferred embodiment, the integration is also performed digitally, as follows. At periodically-recurrent successive times, for example 200 times per second, the microprocessor recomputes the quantity $dF_{sl}/dt$ and sums the values of $dF_{sl}/dt$ so-obtained algebraically, that is, adding or subtracting the successive increments $dF_{sl}/dt$ depending on whether they are positive or negative in sign. This summation is used as the signal representing $F_{sl}$ in the next computation of the above-set-forth differential equation, and is also used as the smoke limit during the periods when objectionable puffs might be generated. For reasons which will be made clearer hereinafter, since the calculations and summations are performed 200 times per second, only 1/200 of the value of $dF_{sl}/dt$ is used in each increment. Thus the signal $F_{sl}$ is an accurate representation of the integral of $dF_{sl}/dt$, subject only to very small errors because the calculations have been made 200 times during each second rather than continuously.

In the preferred embodiment, the position of the rack which controls the injection pump fuel delivery is controlled by a bi-directional stepping motor, so that the rack is displaced from a reference position by a number of steps equal to the integer portion of the last-calculated value of $F_{sl}$. The rack executes a step in either direction only when the digital signal representing $F_{sl}$ increases or decreases by one. If $dF_{sl}/dt$ is sufficiently great, $F_{sl}$ may increase after each such calculation and the stepping motor will move the rack at the maximum speed of 200 steps per second. If on successive calculations the value of $dF_{sl}/dt$ is each time substantially less than one, it will take several, or many, increments of $F_{sl}$ to produce a single step, and the rack will therefore move at a much slower rate. A reversible counter provides an up-to-date electrical indication of the net number of steps of displacement of the rack from its reference position, and acts as a source of the information as to the rack position z for use by the microprocessor, as described above, in making the computation of $dF_{sl}/dt$.

As described in further detail herein, the fuel limit $F_{sl}$ is used to limit the fuel delivery rate only during the time when objectionable puffs might occur. At other times the fuel rate is limited typically by one of several other fuel limits, such as the low idle limit, the maximum torque fuel limit or the high speed limit.

The effect of the above-described arrangement is to provide a fuel limit during puff generation time which closely follows the rate of increase in manifold pressure during the recovery time of the turbocharger, while it is speeding up in an effort to provide sufficient air for a simultaneous demand for higher fuel.

In the preferred embodiment the rack is moved by a stepping motor. By keeping track of the steps in the increase and decrease directions the microprocessor information as to contains the current position of the rack. However, to establish an initial position from which the counting can take place, it is generally important to drive the stepping motor against a positive stop. Once this position is established, further desired motion of the stepping motor actuator can be calculated by adding and subtracting the increase and decrease steps.

It is recognized that while the above-described form of puff control fuel limit is preferred for many purposes, it is possible to generate other forms of puff control fuel limit signal, some of which could be simpler and easier to generate although generally less efficient in terms of slower speed of return of fuel control to the operator and/or with somewhat greater production of smoke during puff intervals.

BRIEF DESCRIPTION OF FIGURES

These and other objects and features of the invention will be more readily understood from a consideration of the following detailed description, taken in connection with the accompanying drawings, in which.

DETAILED DESCRIPTION OF SPECIFIC EMBODIMENTS

Figure 1:
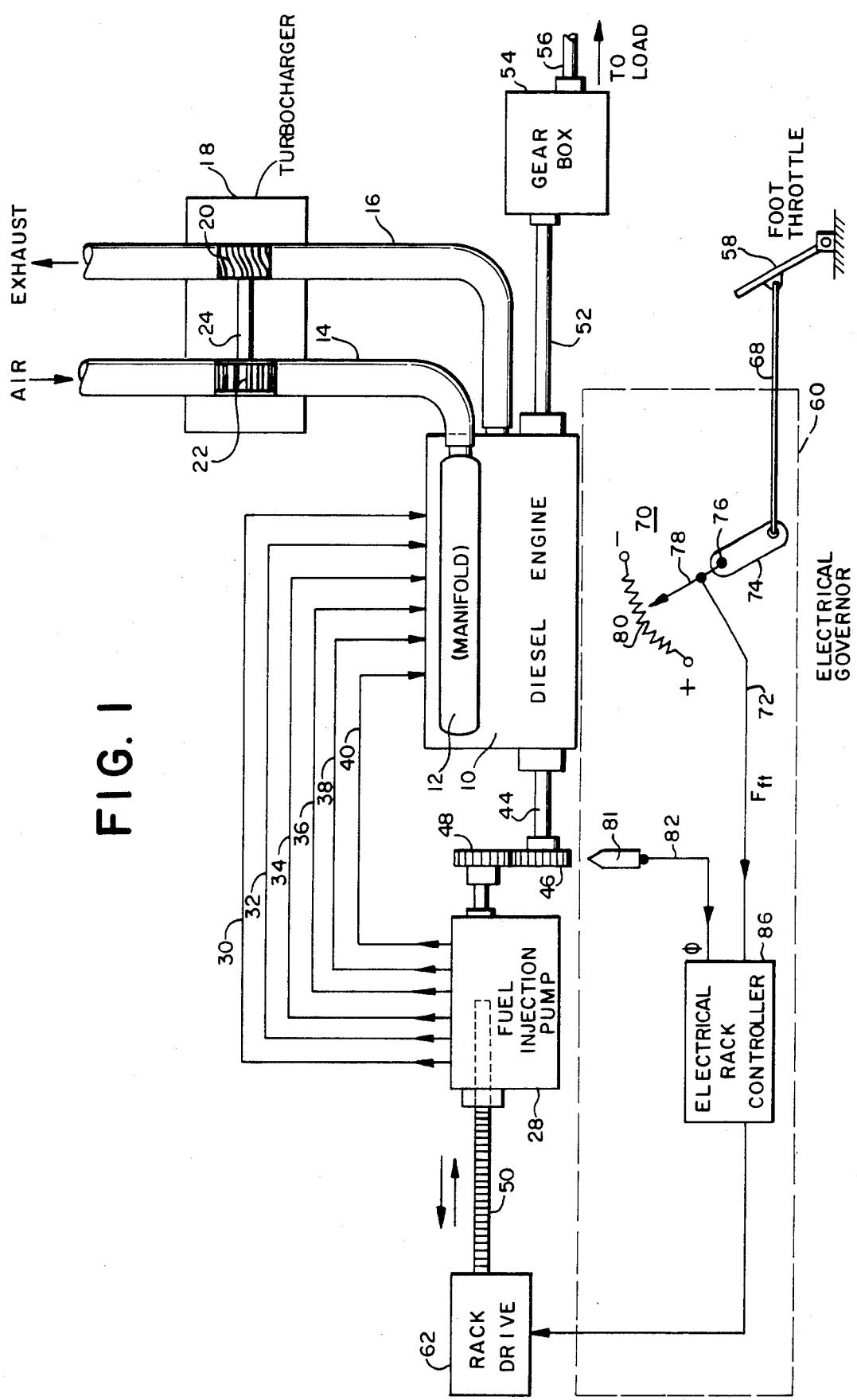
FIG. 1 is a schematic block diagram illustrating an electrically controlled turbocharged diesel engine system in which the present invention may be used.

Referring now to the embodiment of the invention shown in the drawings by way of example only, and without thereby in any way limiting the scope of the invention, FIG. 1 shows schematically a diesel engine system to which the present invention may be advantageously applied.

In this system there is shown a diesel engine 10 which may be of a type suitable for use in large highway trucks. In this example the engine may be a 6-cylinder turbocharged diesel engine such as the type EG-350 engine made by Mack Truck Co. It has the usual intake manifold 12 for supplying air to the several cylinders, an air intake line 14 and an exhaust line 16. The air inlet line and the exhaust line pass through a turbocharger 18, which contains an exhaust-driven rotary turbine 20 in the exhaust line 16, a centrifugal-type air compressor 22 in the air inlet line, and a shaft 24 by means of which the turbine drives the compressor. Turbocharger 18 may, for example, be a type TV 7701 turbocharger such as is commonly supplied by Airesearch Co. for use with the above-identified diesel engine, and is mounted thereto in conventional manner.

In this example, fuel for the diesel engine is supplied in appropriately metered and timed quantities from an appropriate diesel fuel source by means of conventional fuel injection pump 28, such as the Model 300 fuel injection pump made by the American Bosch Division of Ambac Industries Inc. of Springfield, Mass. The fuel injection pump 28 has a plurality of fuel outlet lines for supplying the fuel to the injection nozzles of the diesel engine; in this case, there are six such lines numbered 30 thru 40, one for each of the engine cylinders. The pump is driven by the engine drive shaft 44 by way of appropriate gears 46 and 48, and includes a fuel control rack 50, the horizontal position of which determines the quantity of fuel metered to each cylinder of the engine during each engine cycle. The position Z of the rack is therefore directly proportional to the fuel-delivery rate, and the two functions Z and $F_{del}$ will be used interchangeably herein.

The engine drive shaft also extends to a conventional gear box 54, the output shaft 56 of which operates the load, in this case the driving wheels of the truck. The gear box in this case is assumed to be of the conventional manually operable type which the vehicle operator operates by means of a shift lever and a clutch, in the usual way. Also shown is a foot throttle 58, which the operator of the vehicle depresses in the usual way to indicate the desire for a higher rate of fuel delivery to the engine.

The portion of the system described above may be entirely conventional. However, the usual mechanical governor for the fuel injection pump is omitted, and in place thereof there is employed the electrical governor 60, by means of which the position of the fuel rack 50 is determined, through the rack drive 62. The foot throttle 58, rather than being mechanically connected to the fuel injection pump 28, is connected through mechanical linkage 68 to the mechanical-to-electrical transducer arrangement 70, which in effect senses the position of the foot throttle and produces an electrical signal on line 72 proportional to the foot throttle position. In this example this may be done by means of an arm 74 pivoted at 76 and having a contacter 78 which rotates with the arm so as to contact resistive element 80 at different corresponding positions depending upon the position of the foot throttle. By applying an appropriate voltage across the resistive element, the rotating contacter and line 72 are provided with the desired voltage indicative of foot throttle position. Such devices are well known in the art, and may be briefly described as rotating potentiometer devices.

Another mechanical-to-electrical transducer 81 is positioned adjacent the teeth of gear 46 to produce on line 82 an electrical signal indicative the instantaneous phase of the rotation of gear 46 and hence the phase of the engine drive shaft 44. Typically this device is in the form of a magnetic pick-up which produces a pulse each time one of the teeth of gear 46 passes near it, and the rate of recurrence of these pulses is therefore indicative of engine speed S.

The electrical signal on line 72 therefore represents the fuel level $F_{ft}$ demanded by the operator, while the electrical signal ($\phi$) on line 82 represents the engine phase and, by its rate of recurrence, engine speed; both of the latter signals are supplied to the electrical rack controller 86 which, in the preferred embodiment now to be described, constitutes a digital microprocessor and stepping motor arrangement for operating the rack drive 62 to determine the position of the rack 50 and hence the engine fuel supply at all times.

Figure 7:
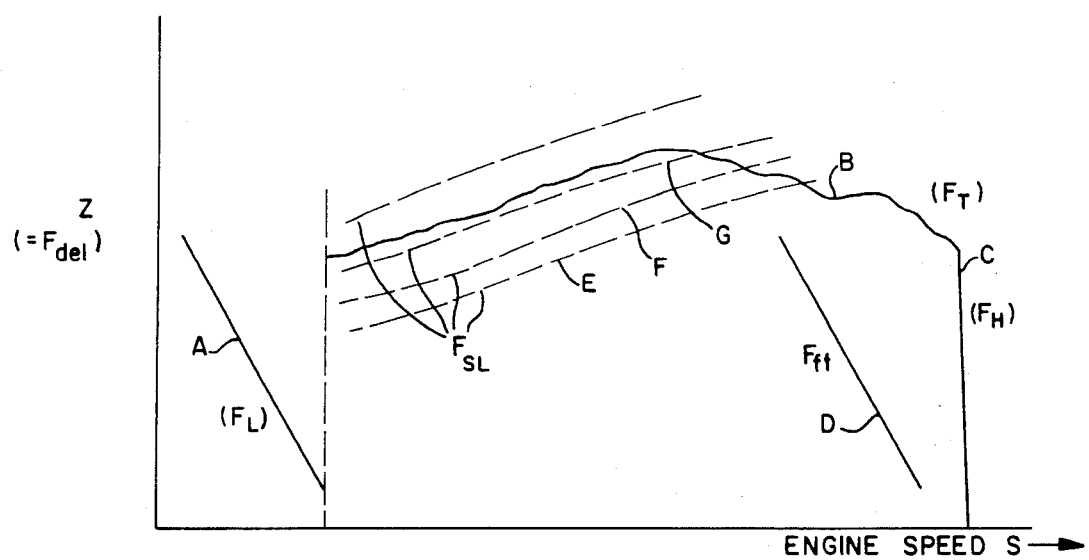
FIG. 7 is a set of graphs showing various fuel limit characteristics as a function of engine-speed.

FIG. 7 illustrates the type of fuel control characteristics which the electrical governor is to produce in this example. In FIG. 7, ordinates represent fuel delivered to the engine per engine cycle ($F_{del}$), and hence also rack position Z, and abscissae represent engine speed S. Curve A represents a desired low-idle fuel limit characteristic, curve B represents a desired steady-state maximum-fuel limit, curve C represents a high-idle fuel limit characteristic, curve D represents the usual variable-speed fuel-characteristic produced by the operation of the foot throttle, and curves E, F and G represent approximately several of the typical shapes and positions of the puff-control fuel limit which controls the fuel during the puff generating intervals. Curves A, B and C are not of the essence of the present invention, and may be provided conventionally by the microprocessor. All that is necessary is for the microprocessor memory to store each of these characteristics in the form of a signal representing the fuel limit for each of the values of speed covered by each of these characteristics. As will be described latter herein, appropriate logic circuitry determines whether, at any given time, the position of fuel rack 50 is controlled by one or another of the steady-state characteristics A, B, C or D, or by the puff control characteristics such as E, F, G.

Figure 3:
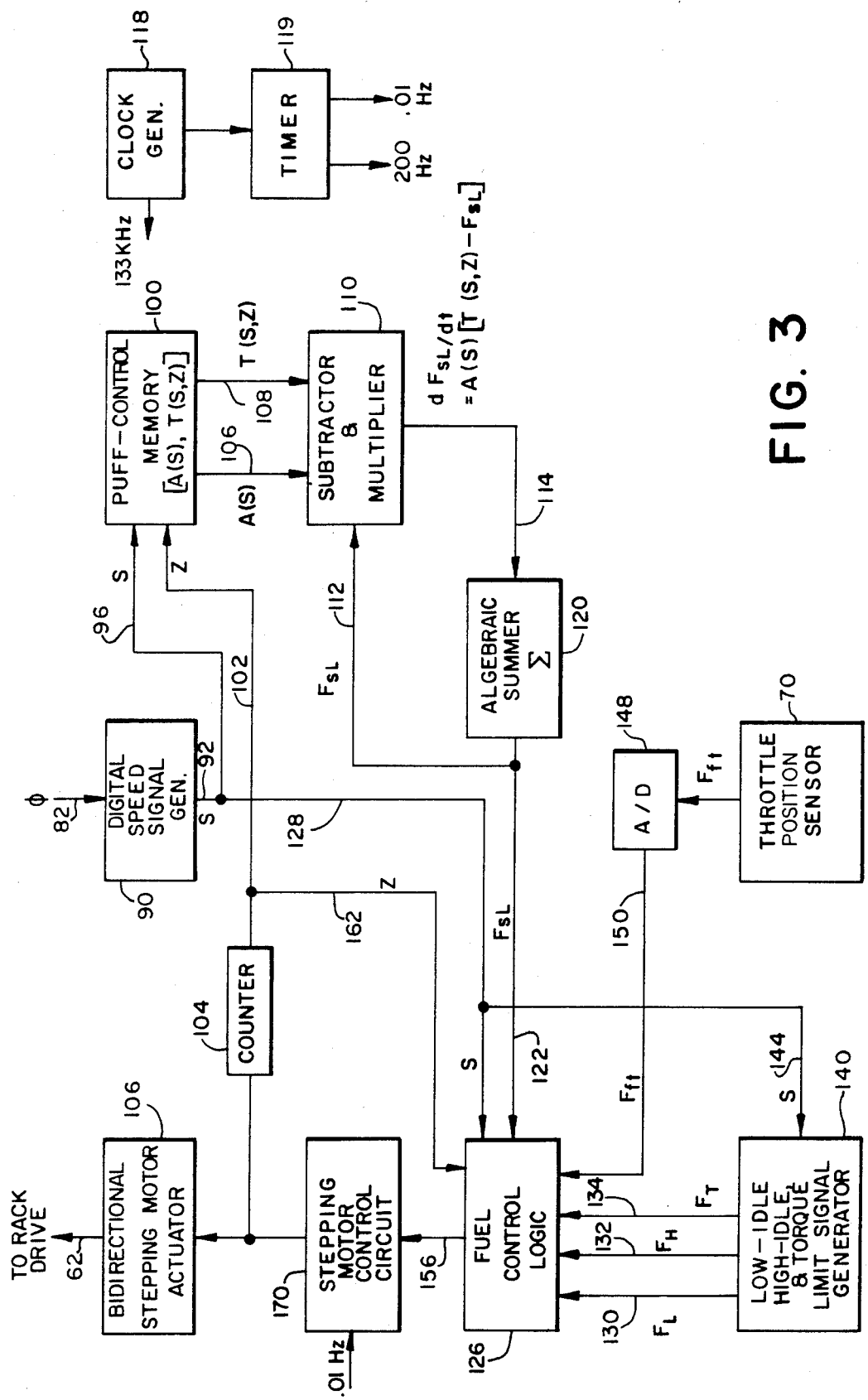
FIG. 3 is a more detailed block diagram of one form for the electronic governor shown in FIG. 1.

Referring now to FIG. 3, which illustrates in block form one configuration of electrical rack controller 86, the engine-phase representing signal on lead 82 is applied to a digital speed-signal generator 90 which may be a conventional frequency-to-DC converter for producing a speed-representative signal at its output lead 92. The speed-representing signal on lead 96 is supplied as an input to puff control memory 100.

Puff control memory 100 is also supplied with a digital signal Z over line 102. Signal Z represents the total pulse count accumulated in a counter 104, which accumulates a count indicative of the number of steps by which the stepping motor actuator 106 has displaced the rack 50 from a reference position thereof, as will be described more fully hereinafter.

Puff control memory 100 stores two functions characteristic of the engine and turbocharger combination being controlled, namely A(s) and T(s,z). The manner in which these functions are determined for a particular type of engine and turbocharger, and placed in the memory, will be described below. For the present it will be assumed that such storage has previously been effected, and for any value of S on input lead 96, memory 100 will deliver on its output lead 106 a signal representative of the corresponding value of the function A(s); and, in response to the speed-representing signals on lead 96 and the rack position signal Z on input lead 102, will produce on its output lead 108 an electrical signal representing the corresponding value of the function T(s,z).

The latter two signals are supplied to a subtracter and multiplier 110, which is also supplied by way of lead 112 with a signal representing $F_{sl}$, the fuel limit to be used to control maximum fuel during the puff generating intervals. Subtracter and multiplier 110 respond to these inputs to produce on its output line 114 a signal representing the function $A(s)[T(s,z - F_{sl}]$, which function is equal to $dF_{sl}/dt$. In the present form of the invention, the calculation of $dF_{sl}/dt$ is made at periodically recurrent intervals, for example 200 times/second. To control the timing of this operation and other operations in the system, there is provided a conventional clock generator 118 for producing timing pulses at the basic bit rate for the system, typically 133 kilohertz, and a timer 119 synchronized by the output of the clock generator for producing a 200 hertz timing signal, as well as a 0.01 hertz timing signal used for other purposes to be described. In the interest of clarity, the connections from the clock generator and timer to each of the various elements of the system are not specifically shown.

The successive computed values of $dF_{sl}/dt$ are supplied to a digital algebraic summer 120 which computes the cumulative sum of the successive values of $dF_{sl}/dt$ supplied thereto, with appropriate regard to sign, to produce on its output lead 122 a signal representing $F_{sl}$, the desired fuel limit for controlling puffs. The summer 120 therefore serves as a discrete digital integrator, to produce the desired signal $F_{sl}$ from its time-derivative.

It is noted that it is this computed signal $F_{sl}$ which is also supplied over lead 112 as one input to the subtracter and multiplier 110, for the purpose of generating the next value of $dF_{sl}/dt$.

The signal $F_{sl}$ on lead 122 is supplied to fuel control logic 126, which is also provided with the speed-representing signal S over line 128. Other inputs to the fuel control logic include the low-idle fuel signal $F_L$ on line 130, the high-idle fuel limit signal $F_H$ on line 132 and the steady-state torque limit signal $F_T$ on line 134, all produced by generator 140. The generator 140 is also supplied with the speed-representing signal S over input lead 144, and by storing in its memory the proper values of $F_L$, $F_H$ and $F_T$ for each value of S, readily provides the latter three output signals by conventional techniques.

The foot throttle signal $F_{ft}$ from throttle position sensor 70 is passed through analog-to-digital convertor 148 and over line 150 to the fuel control logic 126.

Fuel control logic 126 determines which of the signals $F_{sl}$, $F_{ft}$, $F_T$ and $F_H$ is the smallest, and then compares this selected signal with the $F_L$ signal to select which of the latter two signals is the larger. The last-selected larger signal is then compared with the Z signal supplied over line 162; if it is larger than Z, the output signal on line 156 of the fuel control logic indicates that the fuel rack position and the value of Z should be incremented; if it is smaller than the value of Z, it indicates that the rack position should be decremented; and if it is the same as Z its output signal is one indicating that no change in Z should be effected.

The latter signal comparisons and selections can be made by conventional well-known logic circuits and need not be described in detail.

The output signal on lead 156, indicative of whether a change in the rack position is to be made, and if so in which direction, is applied to stepping motor control circuit 170 the output of which is supplied to bidirectional stepping motor actuator 106 to cause the latter motor to step the rack 50 in one direction or the other, or to leave it stationary, depending upon the signal from the fuel control logic 126. The counter 104 is also supplied with the pulses from the control circuit 170, and increases and decreases its count accordingly so as to maintain and store a number indicative of rack position which, as previously mentioned, is used as the source of the Z signal on line 102.

An electrical actuator is used to move the rack of the pump in response to the signal from the electronic governor. A stepping motor actuator 106 is used in this application that has sufficient force capability to overcome the frictional and other resistance to the motion of the rack. Stepping motor actuators have the characteristic of a brisk movement to the next position with a strong holding force when the motion is complete. Furthermore, since they move a specific distance in response to the sequence of pulses, it is unnecessary to use a separate position sensor to determine the position of the rack.

When used with a microprocessor, the stepping motor is nearly ideal. The microprocessor counter 104 can do the arithmetic additions and subtractions necessary to keep track of the incremental motions of the stepping motor. The position of the actuator is continually, i.e. 200 times per second, stored in a word in the microprocessor memory. The microprocessor program may use this stored position as needed in other parts of the program, as, for example, when the target fuel, T(S,Z), is formed.

Figure 6:
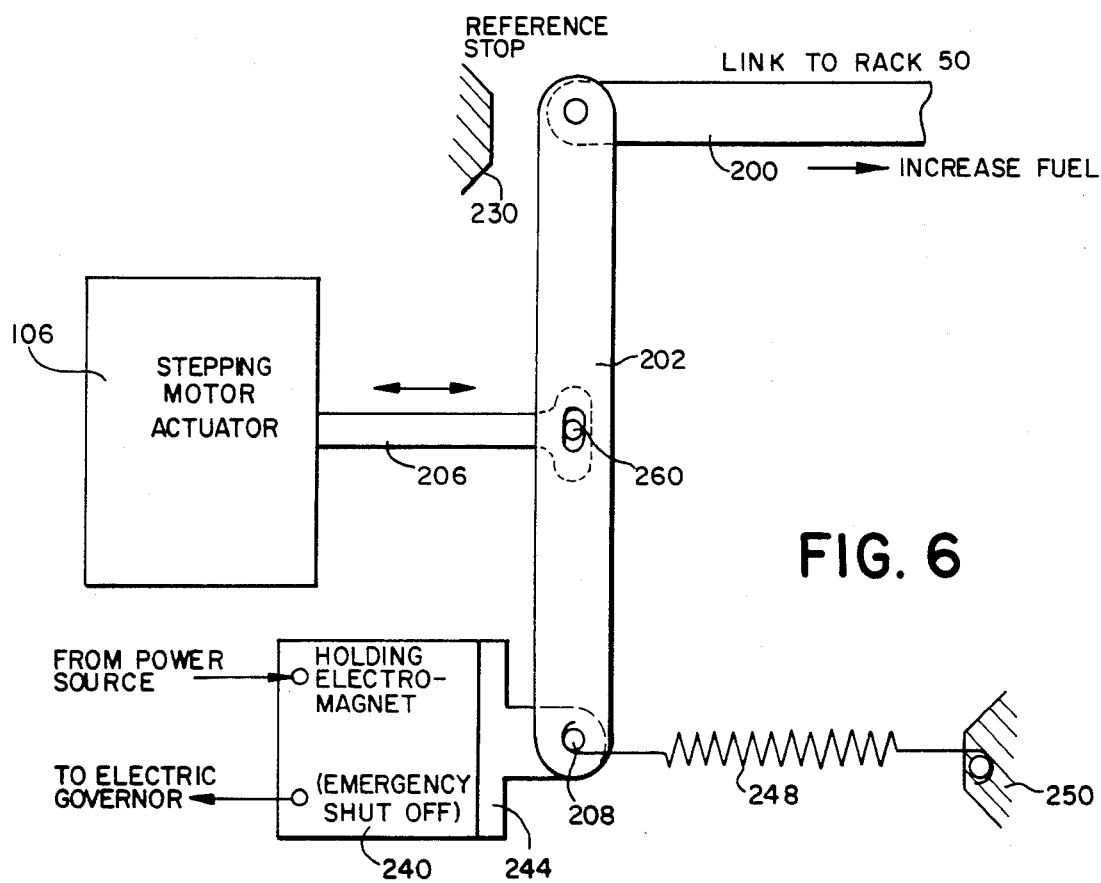
FIG. 6 is a schematic drawing showing details of one form of rack drive arrangement suitable for use in the system.

Referring to FIG. 6, in the embodiment illustrated the stepping motor actuator 106 controls the position of the rack 50 through a link 200, a pivoted arm 202 and a reciprocable drive arm 206. Arm 202 is pivotally mounted on pivot 208 so that clockwise rotation of arm 202 increases the fuel delivery to the engine. The horizontal position of drive arm 206 is controlled by the stepping motor actuator 106, and is pivotably connected to rotate pivot arm 202 about pivot 208 and thus determine the horizontal position of link 200 and thus the fuel delivery. A reference stop 230 is also provided against the upper end of arm 202 to arrest its movement at a predetermined clockwise position and hence limit the minimum fuel delivery to a predetermined low level. An emergency shut-off holding electromagnet 240 is preferably also provided, which when actuated by electrical current through it attracts, and holds against the magnet, an armature 244. Armature 244 is secured to pivot 208, so that in normal operation pivot 208 is in the normal position shown. In addition, a spring 248 is secured at one end to pivot 208 and at the other to a fixed support 250, so as to bias the pivot 208 away from holding magnet 240 with a force which is sufficient to move pivot 208 away from the magnet only if the current through the magnet coils terminates. The current through the magnet coils is provided from the same source which supplies the governor current, so that if the electric governor should lose power, the electromagnet will release armature 244 and permit spring 248 to move pivot 208 to the right and thus pivot arm 202 counterclockwise about the pivot connection 260 of drive arm 206, until the top of arm 202 is arrested by reference stop 230. In this way the rack 50 is set at a predetermined low-fuel position should power to the electric governor be lost.

When the power is removed from the electric governor, the stored electrical information representing the stepping motor's position is lost. When power is restored, the number in the stored motor-position word may have any value. It is therefore desirable to positively locate the stepper motor by registering it at one end of its stroke. Stop 230 is arranged such that when the stepper motor tries to move past this point, it is restrained from further motion. If the microprosessor sends pulses to the stepper motor to cause it to move in the direction of the mechanical stop, and sends as many pulses as there are in the full stroke of the motor, the program is assured that the motor is at the stop. This forms an initial reference from which all subsequent motions are calculated.

Since the stepping motor actuator responds reliably to every pulse, the motor position word stored in the microprocessor is a reliable indication of rack position, inferentially. However, if the stepper motor did not respond properly, even only once, there would be an error in this stored word. Once this error is present, it tends to remain indefinitely. To guard against this remote possibility during a long continuous use, the stepper motor is driven against its positive stop occasionally to reset its position. In a truck application the engine requires no fuel for more than one second during a gear shift. It is possible to run the stepper motor against its stop and back to its zero fuel position in less than 0.25 seconds. The microprocessor periodically sends the stepper motor enough steps to cause it to be against its stop, and then sends additional steps so that the motor will be against the stop even if there is an error. The stepper motor position word is then reset and the stepper motor is returned to its active range.

It is not important that the stepper motor be reset often. It is reset only when it is convenient. During a shift the engine fuel is off for plenty of time for a reset. Since the gears are shifted often, resetting could occur much more often than useful. The microprocessor can be programmed to attempt a reset only 100 seconds after the last completed reset.

Figure 2:
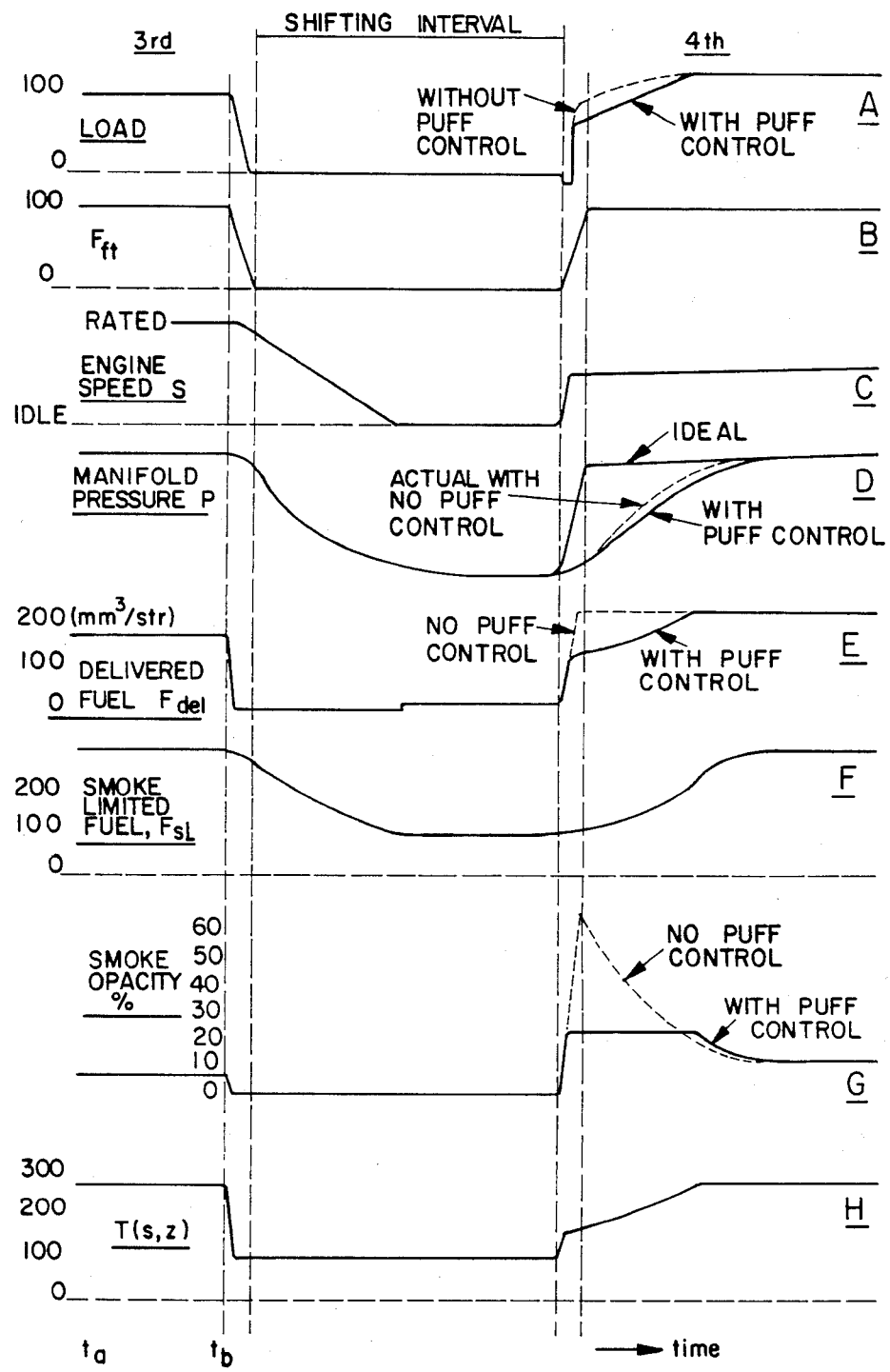
FIG. 2 is a graphical representation showing, at positions A through H respectively, in idealized form, graphical plots of the following quantities against a common time scale: engine load L, position of foot throttle $F_{ft}$, engine speed S, intake manifold pressure P, delivered fuel $F_{del}$, the smoke limit value of fuel $F_{sl}$, the smoke opacity, and the value T(s,z) of the target fuel limit.

Considering in more detail the operation of the system represented in FIG. 3, and with particular reference to the timing diagram of FIG. 2, assume that initially the engine system described is operatively mounted in a truck which is proceeding in third gear at a steady speed, and each of the eight parameters represented in FIG. 2 has a corresponding steady value, as shown under the column marked "3rd". This condition persists in the time from $t_a$ to $t_b$, at which time it is assumed that the operator shifts from third to fourth gear, the times for these latter occurrences being indicated by the headings "shifting interval" and "4th". It will be understood that the graphical representations are idealized, and do not necessarily represent exactly the form which each of the graphs would have for an actual engine.

At time $t_b$ the operator disengages the clutch, thereby rapidly removing the load from the engine and causing the load to fall rapidly to a new constant low level. At the same time, he releases the foot throttle causing the fuel level $F_{ft}$ for which it calls to fall rapidly to a constant low level during the shifting interval. At the same time, the engine speed gradually falls off to a nearly constant lower level, as shown.

Since the air pressure in engine manifold 12 is an increasing function of engine load and speed, and especially of engine load, the manifold pressure P produced by the turbocharger also falls quite rapidly to a nearly constant lower level during the shifting interval. As to the fuel actually delivered to the engine, designated as $F_{del}$, initially it is at a constant relatively high level while the engine is operating under high load, but with release of the foot throttle at time $t_b$ it falls rapidly to substantially zero.

During the initial period, when the system is in third gear and operating under steady-state conditions, the level of manifold pressure P provided by the turbocharger is sufficient to provide an excess of air charge to the engine cylinders, above that which is needed for complete fuel combustion, and objectionable smoking does not occur. The value of the smoke limit signal $F_{sl}$ is also relatively high at this time, corresponding to a fuel limit value which is higher than $F_{del}$ and hence is not effective as a limit during the initial steady-state condition. The target fuel value T is assumed to be initially as shown schematically in the figure.

During the shifting interval, $F_{sl}$ and T fall to lower values, as shown, but the fuel level is still controlled by the throttle level $F_{ft}$, rather than by the smoke limit $F_{sl}$, since the manifold pressure produced by the turbocharger does not fall faster than the fuel delivered $F_{del}$, and there is still ample air for complete combustion. The smoke limit $F_{sl}$ comes into effect when the operator, at the end of the shifting interval, reengages the clutch and reapplies the throttle to suddenly increase L and $F_{ft}$ as shown in the graphs. At this time the engine speed S also increases quite rapidly to its new level, but the manifold pressure P does not, and cannot, rise rapidly because of the lag in turbocharger operation. If it could rise rapidly, as indicated by the portion of curve designated "ideal" in the pressure diagram, the desired excess air charge would be provided proportionate to the rapidly increasing fuel and complete combustion without excessive smoke would result. However, in a real system in which the puff control is not utilized, the turbocharger action only increases at a rate sufficient to produce the relatively gradual increase in manifold pressure P indicated by the dotted line in the P characteristic, and the area between the "ideal" curve and the dotted curve indicates the deficiency in air pressure which would result in objectional smoke during the puff interval.

To counteract this tendency, the smoke limit $F_{sl}$ comes into play during the puff generation interval as shown in the $F_{sl}$ diagram, rising at a more gradual rate generally parallel to the recovery curve for the manifold pressure P, thus limiting the rate of increase of the actual fuel delivered $F_{del}$ to the relatively gradual curve shown in the $F_{del}$ graph. The $F_{del}$ curve shows in dotted line the much higher rate of increase of $F_{del}$ which would occur in the absence of the puff control and which would result in the objectionable puff of smoke.

Referring now to the smoke opacity graph of FIG. 2G, it will be seen that in the steady-state condition in 3rd gear the smoke opacity is at a very tolerable level of about 8%, and drops during shifting to near zero since substantially no fuel is being supplied. Upon completing the shift into 4th-gear operation, without puff control the smoke opacity would momentarily reach a very high level, e.g. 70%, as shown by the broken line in the graph G, because the pressure produced by the turbocharger is momentarily very low compared to the high level of fuel delivered to the engine. The full-line curve in G marked "with puff control" shows the limitation of the opacity during the puff to a relatively low, tolerable value such as 20%, due to the fuel limit established by the smoke limit $F_{sl}$ during the puff interval.

Accordingly, the apparatus of the invention provides a smoke limit fuel level $F_{sl}$ during the puff generation interval which increases in a manner generally tracking the response characteristic of the turbogenerator as reflected in the manifold pressure characteristic, thereby limiting the supply of fuel delivered to that for which the available air in the turbocharger is sufficient to prevent objectionable smoke. Furthermore, since the smoke limit $F_{sl}$ is derived as described from characteristics of the turbocharger stored in the microprocessor memory, it provides a fuel limit which not only prevents objectionable smoke during the puff, but which enables the fuel to rise as rapidly as practical to the level called for by the foot throttle.

The significance of the information stored in the microprocessor for computing $F_{sl}$ by integration of $dF_{sl}/dt = A(s)[T - F_{sl}]$, and especially of the parameter T(s,z) will be more fully understood from the following description of the manner in which the characteristics of the specific engine and turbocharger may be mapped and supplied to the memory of the microprocessor.

The most practical way known to find the T(S,Z) function is to measure its value on an engine while it is being run on a dynamometer. If an engine is run on a dynamometer at a given engine speed and at a given fuel delivery rate, the engine will quickly come to steady state. The supercharging of the intake manifold by the turbocharger will reach a steady state value. The smoke generated under these conditions is moderate. There is enough supercharging air that more fuel could be injected each stroke before a given level of smoke opacity, say 20%, is reached. This value of fuel which if applied would result in an instantaneous smoke opacity of a predetermined level, e.g. 20%, is T(S,Z).

In other words, in a turbocharged diesel engine operating at a speed S and with a rack position Z in steady state, there is enough supercharging that if the rack were moved suddenly to a position which would produce a fuel level T(S,Z), the engine would produce a specified level of smoke opacity briefly until the supercharging increased due to the resulting increase in the energy in the exhaust.

An experimental method for finding a value of T(S,Z) is as follows:

1. On a dynamometer, run the engine at a fixed speed $S_1$ and rack position $Z_1$, until steady state is achieved.
2. Measure intake manifold air pressure, $P_1$.
3. Using an air valve in the intake air passage hold the intake manifold pressure to $P_1$ while increasing fuel and holding S constant.
4. When the fuel is raised enough to cause the smoke to have the desired maximum opacity (20% in this case) while the intake manifold pressure is held to $P_1$, measure the rack position (which corresponds to delivered fuel rate $F_{del}$). This value of fuel is the value of T for the set values of S and Z.

To find an experimental value of A(S), the following procedure is used:

1. On a dynamometer, run the engine at speed S.
2. Using a recorder to record the intake manifold air pressure, suddenly change the rack position.
3. The air pressure record will have generally an exponential shape approaching a steady state value. This record will have a characteristic time constant, $\tau$ in seconds. A(S) is the reciprocal of $\tau$. That is, $A(S) = 1/\tau$.

Figures 4, 5:
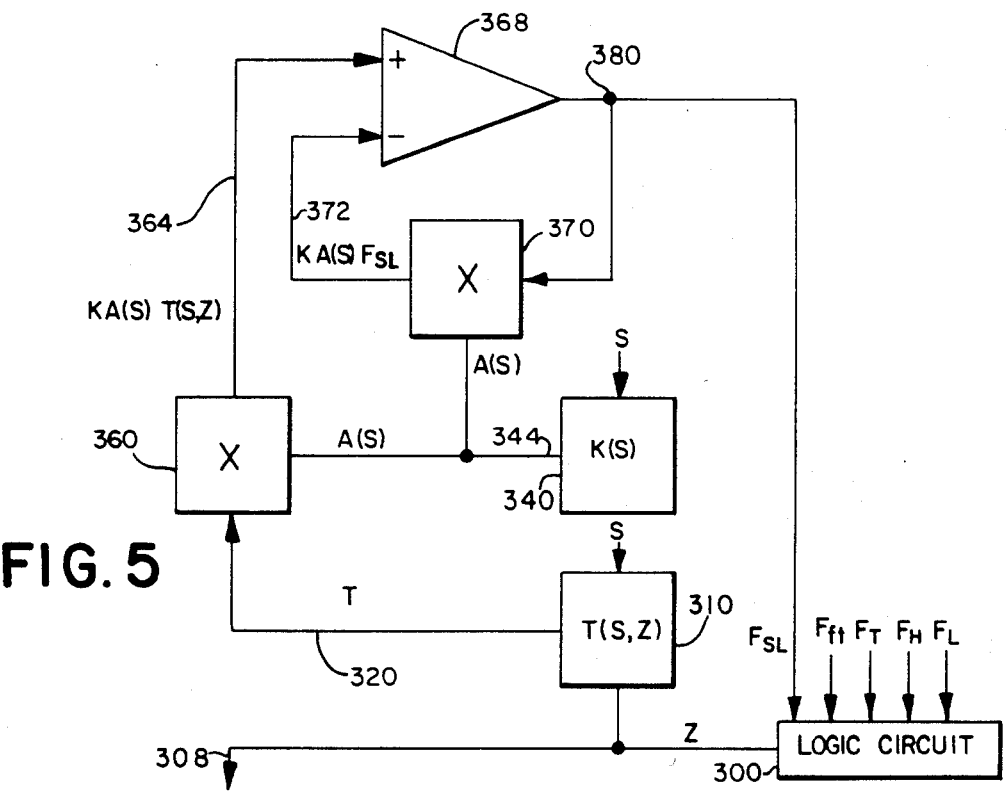
FIG. 4 is a table of typical stored values which may be stored in the memory of the electronic governor.
FIG. 5 is a schematic block diagram illustrating a typical analog system according to the invention.

As an example only, FIG. 4 shows the nature of a part of a typical array in the microprocessor memory for several values of T(S,Z), and a similar array for several values of A(S). For T(S,Z), under the heading "Name" are listed the identification of nine different parameter values for T(S,Z), e.g. T (800,30), identifying the T for a speed of 800 and a rack position 30. Under the heading "Memory Position" are listed nine corresponding numbered positions in the microprocessor memory (e.g. 1024) at which the value of T for the named values of S and Z is stored. Under the heading "Stored Value" are the latter corresponding values of T, e.g. 67. During normal operation, S and Z are constantly monitored by the electric governor, and the named combination of S and Z that is being produced by the engine is automatically determined and used to access the corresponding memory location and read out the corresponding stored value of T(S,Z) at all times.

Similarly, for A(S) the named value of S accesses the numbered memory position at which the corresponding value of A(S) is stored, and reads it out.

It will be understood that in practice many more values of S and Z will normally be used to accomplish a substantially complete mapping of the S,Z characteristic of the particular engine type. While each engine can be so mapped and its characteristic stored in its associated microprocessor memory, it is contemplated that the mapping obtained for an engine of a given type will be adequate for others of the same type.

While digital information of the invention is preferred, it may also be inplemented in analog form, as shown schematically in FIG. 5. Thus, one may derive, by conventional analog means, analog electrical signals having values proportional to the fuel $F_{ft}$ demanded by the foot throttle position, the fuel level $F_T$ representing the maximum-torque fuel limit, the maximum-speed fuel limit $F_H$ and the low-idle fuel limit $F_1$. These may be supplied to a logic circuit 300, to which is supplied also the signal $F_{sl}$ representing in analog form the puff-control fuel limit. The analog logic circuit 300 selects the smallest of the signal levels of signals $F_{ft}$, $F_T$, $F_H$ and $F_{sl}$, and produces a rack-control signal Z which is equal to the so-selected signal level or $F_L$, whichever is greater; the rack control signal Z is applied over line 308 to set the rack at a position corresponding to the value of the Z signal.

The Z signal is also supplied to a conventional type of analog function generator 310, which is also supplied with an analog signal S proportional to engine speed. Generator 310 functions to produce on its output line 320 an analog signal proportional to the value of the function T for the values of S and Z supplied to it. Another conventional type of analog function generator 340 is supplied with the speed-representing signal S, and produces on its output line 344 an analog signal proportional to the value of the function A(S) for the values S supplied to it.

An analog multiplier 360 multiplies the signals A(S) and T(S,Z) to produce the product A(S) T(S,Z), which is supplied over line 364 to the positive input terminal of a differential operational amplifier circuit 368 connected as an integrator. Another analog multiplier 370 is supplied with the signal A(S), and with a signal $F_{sl}$ from the output of the integration 368, to produce on its output line 372 a product analog signal K A(S) $F_{sl}$, which is applied over line 372 to the negative input terminal of the amplifier-integrator 368. Amplifier and integrator circuit 368 responds to its two inputs to produce at its output line 380 an analog signal proportional to the integral of the difference of its input signals, e.g. a signal proportional to A(S) T(S,Z)−A(S) $F_{sl}$. It can readily be seen that the latter expression is equal to A(s) [T(S,Z)−$F_{sl}$], the desired new value of $F_{sl}$, which is applied to the logic circuit 300 as described above.

While the invention has been described with particular reference to specific embodiments thereof in the interest of complete definiteness, it will be understood that it can be embodied in other diverse forms without departing from the spirit and scope of the invention as defined by the appended claims.

What is claimed is:

1. Smoke control apparatus for a turbocharged engine, comprising:
   means for producing one or more signals representative of one or more definitive parameters of the kinetic energy of the engine exhaust flow which drives the turbocharger of said engine, said one or more signals being independent of any measured value of intake air pressure of the engine;
   means for storing information which is a function of the response of said turbocharger to changes in said parameters;
   means for accessing said information in response to said one or more signals and independently of any measured value of intake air pressure of the engine, to produce one or more other signals representative of substantially the maximum rate at which the delivery of fuel to said engine can be increased from its existing level without producing more than a predetermined level of smoke from said exhaust; and
   means for limiting said rate of increase of fuel delivery in response to said one or more other signals to prevent said rate of increase in fuel delivery from rising above said substantially maximum rate.

2. The apparatus of claim 1, comprising throttle means capable of producing rates of increase in demand for fuel delivery to said engine in excess of said substantially maximum rate of increase, and wherein said means for limiting said rate of increase of fuel delivery holds said rate at said substantially maximum rate when said throttle means produces said increases in demand.

3. Puff control apparatus for a turbocharged diesel engine, comprising:
   means for producing one or more signals representative of the kinetic energy of the exhaust flow from said engine, said one or more signals being exclusive of any measured value of intake air pressure of the engine;
   means for storing information which is a function of the response of the turbocharger of said engine to the kinetic energy of the exhaust flow from said engine;
   means for accessing said information in response to said one or more signals and exclusively of any measured value of intake air pressure of the engine, to produce another signal representative of substantially the maximum rate at which the delivery of fuel to said engine can be increased at any time without producing more than a predetermined level of exhaust smoke from the exhaust of said engine; and
   means for controlling said rate of increase of fuel delivery in response to said another signal to hold it below said substantially maximum level.

4. Puff-control apparatus for a turbocharged diesel engine, comprising:
   means for measuring the speed of said engine and for producing a signal representative of said speed, and means for measuring the rate of fuel delivery to said engine and for producing a signal representative thereof;
   means for storing information definitive of the response of said turbocharger to different values of said speed and said fuel delivery rate;
   means for accessing said information in response to said speed-representing signal and said fuel-delivery rate signal and independently of any measured value of intake air pressure of the engine, to produce a read-out signal from said memory containing information corresponding to the values of speed and fuel-delivery rate represented by said signals applied thereto;
   means for deriving from said read-out signal and independently of any measured value of intake air pressure of the engine, a signal representative of the instantaneous increase in fuel delivery rate which can be provided without producing exhaust smoke of greater than a predetermined level from said engine; and
   means for limiting the rate of increase in said fuel delivery rate in response to said last-named signal to maintain it below said level.

5. Apparatus for controlling the generation of smoke of greater than a predetermined level in the exhaust of a turbocharged diesel engine, comprising:
   electrical memory means storing information which is a known function of the response of the turbocharger to changes in speed of said engines and in the rate of delivery of fuel thereto per engine cycle;

means for deriving from said stored information and independently of any measured value of intake air pressure of the engine, a fuel-limiting signal representative of the maximum value of said rate of fuel delivery which can be permitted without producing more than a predetermined level of smoke from said exhaust during acceleration of said turbocharger; and means responsive to said fuel-limiting signal for limiting said rate of fuel delivery to said maximum rate.

6. Apparatus for controlling the generation of objectionable smoke from the exhaust of a turbocharged diesel engine, comprising:

means for producing signals representative of the speed of said engine;

means for producing signals representative of the rate of delivery of fuel to said engine per engine cycle;

microprocessor means comprising electrical information storage means permanently storing information as to the response of said turbocharger to changes in engine speed and to changes in said fuel delivery rate, said microprocessor means being responsive to said speed-representing signals and said signals representative of fuel delivery rate, independently of any measured value of intake air pressure of the engine, to access said information and to produce fuel-limiting signals representative of the maximum rate at which fuel can be delivered to said engine without producing more than a predetermined level of smoke from said exhaust during acceleration of said turbocharger; and means for controlling said rate of fuel delivery by said fuel-limiting signals during acceleration of said turbocharger.

7. Apparatus according to claim 6, wherein said storage means stores accessible information in the form of at least two different functions, and said microprocessor comprises calculating means responsive to signals representing said two different functions said to produce said fuel-limiting signals.

8. Apparatus according to claim 7, wherein said at least two functions comprise one function of engine speed alone and another function of both engine speed and said rate of fuel delivery.

9. Apparatus for controlling the rate of delivery of fuel to a turbocharged diesel engine connected to a load through shiftable gears, to control the level of smoke in the exhaust thereof when the fuel demand increases rapidly following shifting of said gears, said apparatus comprising mechanical control means for determining the rate of delivery to said engine and throttle means adjustable to indicate a variable demand for the rate of fuel delivery to said engine, wherein said apparatus further comprises:

means responsive to the adjustment of said throttle means for producing a first signal $F_{ft}$ representative of said variable demand;

means for producing a second signal S representing the speed of said engine;

means for producing a third signal $F_{del}$ representative of the rate of fuel delivery to said engine produced by said mechanical control means;

microprocessor means storing information enabling calculation of the maximum rate at which said rate of fuel delivery $F_{del}$ can be increased for various values of $F_{del}$ and S, without producing more than a predetermined level of smoke in said exhaust;

means supplying said second signal S and said third signal $F_{del}$ to said microprocessor means to cause it to calculate the value of said maximum rate corresponding to the corresponding values of said signals S and $F_{del}$ and to produce a fourth signal $dF_{sl}/dt$ representative thereof;

said microprocessor means also comprising integrating circuit means supplied with said fourth signal for producing therefrom a fifth signal $F_{sl}$ representing the maximum rate at which fuel can be delivered to said engine at that time without producing more than said predetermined level of smoke in said exhaust;

said microprocessor means being responsive to said fifth signal $F_{sl}$ to perform said calculating of said fourth signal $dF_{sl}/dt$ in response to said information stored therein and in response to said fifth signal $F_{sl}$;

electrical means for controlling said mechanical control means and supplied with said fifth signal $F_{sl}$ and with said first signal $F_{ft}$ for automatically limiting the value of the rate of fuel delivery $F_{del}$ to said engine to a level corresponding to the level of said fifth signal $F_{sl}$ when the value of $F_{sl}$ is less than the value of $F_{ft}$.

10. The apparatus of claim 9, wherein said microprocessor means calculate the values of said fourth signal $dF_{sl}/dt$ substantially according to the formula $$dF_{sl}/dt = A(s)\,[T(S,Z) - F_{sl}],$$

where Z represents the position of said mechanical control means and hence the value of $F_{del}$.

11. The apparatus of claim 10, wherein A(s) is inversely proportional to the time constant of the exponential approach of the pressure produced by said turbocharger toward its steady state value when the fuel supplied to said engine operating at a speed S is abruptly increased to a new steady value.

12. The apparatus of claim 10, wherein said function T(S,Z) is proportional to the maximum rate of fuel delivery to said engine which can be employed without producing exhaust smoke in excess of said predetermined level, for various combinations of initial values of engine speed S and fuel delivery rate $F_{del}$.

13. In a method for controlling the level of exhaust smoke from a turbocharged diesel engine by generating stored information indicative of the rate at which the fuel delivery to said engine can be increased without producing exhaust smoke of more than a predetermined level:

operating said engine at various known speeds S;

at each of a plurality of initial speeds S, abruptly increasing the rate of supply of fuel to said engine to a steady value and measuring the increasing pressure generated by said turbocharger as its speed rises exponentially toward a steady state value;

storing in a memory device a function A(S) of the values of the time constant of said exponential increases corresponding to different values of said initial speeds S;

operating said engine at various known initial steady-state speeds S and fuel delivery rates $F_{del}$, and, at each such combination of speed and fuel delivery rate, increasing and measuring the fuel delivery rate while holding constant the engine speed S and the air pressure generated by said turbocharger and while measuring the level of smoke from said exhaust, until a value $T(s,F_{del})$ is reached for which said level of smoke reaches said predetermined level; and storing in said memory the values of $T(S,F_{del})$ so determined.

14. The method controlling the level of smoke produced by the exhaust of said engine, in another engine of similar characteristics, by performing the steps of claim 13, thereafter continually monitoring said another engine during its operation to produce signals representing engine speed S and fuel delivery rate $F_{del}$, applying said signals to said memory device to read out therefrom the values of $A(S)$ and $T(S,F_{del})$ corresponding to the contemporaneous value of S and $F_{del}$ for said engine, computing from said values of $A(S)$, $T(S,F_{del})$ and from $F_{del}$ the corresponding values of a function $dF_{sl}/dt$ equal to $A(S)[T(S,F_{del}-F_{SL}]$, and limiting the maximum rate of increase of said fuel delivery to the value of said function $dF_{sl}/dt$.

* * * * *